US007232214B2

(12) United States Patent
Yip et al.

(10) Patent No.: US 7,232,214 B2
(45) Date of Patent: *Jun. 19, 2007

(54) METHOD FOR INCREASING THE DIAMETER OF AN INK JET INK DOT

(75) Inventors: Kwok-Leung Yip, Webster, NY (US); Lori J. Shaw-Klein, Rochester, NY (US); Andrew Clarke, Berkhampstead (GB); Brian G. Price, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 341 days.

This patent is subject to a terminal disclaimer.

(21) Appl. No.: 10/872,711

(22) Filed: Jun. 21, 2004

(65) Prior Publication Data

US 2005/0023244 A1 Feb. 3, 2005

Related U.S. Application Data

(63) Continuation-in-part of application No. 10/324,847, filed on Dec. 20, 2002, now Pat. No. 6,945,647.

(51) Int. Cl.
*B41J 2/01* (2006.01)
*G01D 11/00* (2006.01)

(52) U.S. Cl. ...................................... 347/105; 347/100

(58) Field of Classification Search ................ 347/105, 347/100, 101; 428/195, 32.1
See application file for complete search history.

(56) References Cited

U.S. PATENT DOCUMENTS

| | | | | |
|---|---|---|---|---|
| 5,429,860 | A * | 7/1995 | Held et al. | 428/32.3 |
| 5,569,529 | A * | 10/1996 | Becker et al. | 428/32.38 |
| 6,025,111 | A * | 2/2000 | Schell et al. | 430/212 |
| 6,114,022 | A * | 9/2000 | Warner et al. | 428/315.5 |
| 6,150,289 | A | 11/2000 | Chen et al. | |
| 6,214,458 | B1 | 4/2001 | Kobayashi et al. | |
| 6,399,156 | B1 * | 6/2002 | Wexler et al. | 427/407.1 |
| 6,497,479 | B1 * | 12/2002 | Stoffel et al. | 347/100 |
| 6,607,269 | B2 * | 8/2003 | Sumioka et al. | 347/105 |
| 6,634,743 | B2 * | 10/2003 | Perchak et al. | 347/101 |
| 6,649,250 | B2 * | 11/2003 | Laney et al. | 428/195.1 |
| 6,921,562 | B2 * | 7/2005 | Yip et al. | 428/32.21 |

FOREIGN PATENT DOCUMENTS

| | | |
|---|---|---|
| EP | 0 802 245 A1 | 10/1997 |
| EP | 1 266 764 A2 | 12/2002 |

* cited by examiner

*Primary Examiner*—Stephen Meier
*Assistant Examiner*—Leonard Liang
(74) *Attorney, Agent, or Firm*—Chris P. Konkol

(57) ABSTRACT

A method for increasing the diameter of an ink jet ink dot resulting from the application of an ink jet ink drop applied to the surface of an ink jet recording medium having a support having thereon an image-receiving layer, the image-receiving layer containing: a) from about 20 to about 65% by volume of particles; b) from about 25 to about 70% by volume of a polymeric binder; and c) up to about 10% by volume of a cross-linking agent; the method comprising applying the ink jet ink drop on the surface of the image-receiving layer whereby the diameter of the ink jet ink dot is increased relative to that which would have been obtained if the image-receiving layer had greater than about 65% by volume of particles.

11 Claims, No Drawings

METHOD FOR INCREASING THE DIAMETER OF AN INK JET INK DOT

CROSS REFERENCE TO RELATED APPLICATIONS

This is a continuation-in-part of application Ser. No. 10/324,847, filed Dec. 20, 2002 now U.S. Pat. No. 6,945,647 entitled "Method For Increasing The Diameter Of An Ink Jet Ink Dot" by Kwok L. Yip et al.

Reference is made to the following commonly assigned, U.S. patent and co-pending U.S. patent application, respectively:

U.S. Pat. No. 6,634,743 by Perchak et al., issued Oct. 21, 2003 entitled "Method For Increasing the Diameter of an Ink Jet Ink Dot"; and Application Ser. No. 10/324,483 by Yip et al., filed Dec. 20, 2002 entitled "Ink Jet Recording Element."

FIELD OF THE INVENTION

The present invention relates to a method for increasing the diameter of an ink jet ink dot.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water and an organic material such as a monohydric alcohol, a polyhydric alcohol or mixtures thereof.

An ink jet recording element typically comprises a support having on at least one surface thereof an ink-receiving or image-receiving layer, and includes those intended for reflection viewing, which have an opaque support, and those intended for viewing by transmitted light, which have a transparent support.

An important characteristic of ink jet recording elements is their need to dry quickly after printing. To this end, porous recording elements have been developed which provide nearly instantaneous drying as long as they have sufficient thickness and pore volume to effectively contain the liquid ink. For example, a porous recording element can be manufactured by cast coating, in which a particulate-containing coating is applied to a support and is dried in contact with a polished smooth surface.

When an ink drop contacts the ink jet recording medium, the drop initially spreads on the surface and then begins to adsorb into the medium. The ink adsorbs vertically into the medium as well as radially. The rate of ink adsorption depends on the nature of the medium. Ink adsorption in non-porous media comprising hydrophilic polymers takes place due to molecular diffusion and occurs at a much slower rate than for porous media where the ink adsorption occurs due to capillary action. The adsorption of the ink drop transports a colorant into the medium to form the image.

The diameter of the resulting colorant in the medium is referred to as dot size. Dot size is an important parameter in ink jet printing systems and is a key component in establishing image quality and printer productivity. Smaller dot sizes yield a gain in edge acuity but decrease printer productivity. Larger dot sizes can cover up for printing errors due to misplaced drops. Therefore, the ability to control dot size is an important issue for ink jet printing systems.

Dot gain refers to the increase in dot size over the initial, spherical drop diameter. The dot gain is determined by the ratio of the final dot diameter on the recording medium to the initial drop diameter. The desired dot size is typically achieved by controlling the drop volume, i.e., larger volume drops produce larger dot sizes in the medium. It would be desirable to find a way to increase dot size without having to increase drop volume.

U.S. Pat. No. 6,114,022 relates to a method for controlling the dot diameter on an ink jet receptive medium that employs a microporous medium and a porous imaging layer. The dot gain achieved by this process is about 3.5. However, there are problems with this method in that the amount of dot gain is not as large as one would like and the process is limited to pigmented inks.

It is an object of this invention to provide a method for increasing the dot gain of an ink jet ink drop applied to an ink jet recording element in an amount of up to about 15. It is another object of the invention to provide a method for increasing the diameter of an ink jet ink dot resulting from the application of an ink jet ink drop wherein the ink jet ink comprises a dye.

SUMMARY OF THE INVENTION

These and other objects are achieved in accordance with the invention which comprises a method for increasing the diameter of an ink jet ink dot resulting from the application of an ink jet ink drop applied to the surface of an ink jet recording medium comprising a support having thereon an image-receiving layer, the image-receiving layer containing:

a) from about 20 to about 65% by volume of particles;

b) from about 25 to about 70% by volume of a polymeric binder; and c) up to about 10% by volume of a cross-linking agent;

the method comprising applying the ink jet ink drop on the surface of the image-receiving layer whereby the diameter of the ink jet ink dot is increased relative to that which would have been obtained if the image-receiving layer had greater than about 65% by volume of particles.

By use of the method of the invention, the dot gain of an ink jet ink drop applied to an ink jet recording element can be in an amount of up to about 15 and the ink jet ink can comprise a dye.

Another advantage of the invention is that a smaller volume of ink jet ink drops can be used to achieve dot sizes equivalent to those obtained with larger volume drops. This results in increased printer productivity since fewer dots are needed to cover an area of the recording medium, and the drying times are faster.

When the volume percentage of particles in the image-receiving layer is more than about 65%, the imaging layer behaves like a porous medium in which the absorption of ink is due to the capillary pressure of the pores. Typical dot gain for a porous receiver is about 2.0. As the volume percentage of particles is reduced from about 65%, the binder will swell upon the absorption of ink and plug the pores near the receiver surface. This impedes further penetration of ink into the medium and allows more time for the drop to move laterally on the receiver surface, resulting in a much larger dot gain than a typical porous receiver. On the other hand, when he volume percentage of the binder is more than 70%, the image-receiving layer behaves like a non-porous medium in which the absorption of ink is by molecular diffusion. In this case, the dot gain would become about 2.0 to 3.0 for a typical non-porous receiver. In general, the volume percentage of a component in a mixture can be calculated from the given weight percentage of the components. As an example, for a binary mixture, the volume percentage of each component is given by $$v_1 = \frac{\rho_2 w_1}{\rho_2 w_1 + \rho_1 w_2},\quad v_2 = \frac{\rho_1 w_2}{\rho_2 w_1 + \rho_1 w_2}$$

where $\rho_1$ and $\rho_2$ are the mass density of the two components, and $w_1$ and $w_2$ are the weight percentage of the two components.

DETAILED DESCRIPTION OF THE INVENTION

The support for the ink jet recording medium used in the invention can be any of those usually-used for ink jet receivers, such as resin-coated paper, paper, polyesters, or microporous materials such as polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propioriate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint. In a preferred embodiment, polyethylene-coated paper is employed.

The support used in the invention may have a thickness of from about 50 to about 500 μm, preferably from about 75 to 300 μm. Antioxidants, antistatic agents, plasticizers and other known additives may be incorporated into the support, if desired.

In order to improve the adhesion of the ink-receiving layer to the support, the surface of the support may be subjected to a corona-discharge treatment prior to applying the image-receiving layer.

In a preferred embodiment of the invention, the polymeric binder employed is a hydrophilic polymer such as poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. In another preferred embodiment of the invention, the hydrophilic polymer is poly(vinyl alcohol), hydroxypropyl cellulose, hydroxypropyl methyl cellulose, gelatin, or a poly(alkylene oxide). In yet still another preferred embodiment, the hydrophilic binder is poly(vinyl alcohol).

The particles which may be used in the invention may be organic or inorganic. Examples of such particles include alumina, fumed alumina, colloidal alumina, boehmite, clay, calcium carbonate, titanium dioxide, calcined clay, aluminosilicates, silica, colloidal silica, fumed silica, barium sulfate, or polymeric beads such as vinyl chloride/vinyl acetate or urethane. The particles may be porous or nonporous.

The particles may also be polymeric particles comprising at least about 20 mole percent of a cationic mordant moiety useful in the invention can be in the form of a latex, water dispersible polymer, beads, or core/shell particles wherein the core is organic or inorganic and the shell in either case is a cationic polymer. Such particles can be products of addition or condensation polymerization, or a combination of both. They can be linear, branched, hyper-branched, grafted, random, blocked, or can have other polymer microstructures well known to those in the art. They also can be partially crosslinked. Examples of core/shell particles useful in the invention are disclosed and claimed in U.S. patent application Ser. No. 09/772,097, of Lawrence et al., filed Jan. 26, 2001, the disclosure of which is hereby incorporated by reference.

In a preferred embodiment of the invention, the organic or inorganic particles have a particle size of from about 0.01 μm to about 0.1 μm, preferably from about 0.03 μm to about 0.07 μm.

Regarding different particles, preferably inorganic particles, the composition of the recording medium at which a large dot gain phenomenon occurs is approximately the same based on the volume percent (compared to the weight percent) of the particle material. For example, for both silica and alumina coatings, the dot gain starts to increase rapidly at about 50 volume percent of the inorganic material in the recording element for both the silica and alumina coatings. Preferably, therefore, the volume percent of the particles is not more than 50 volume percent, more preferably not more than about 45 volume percent, and most preferably not more than about 40 volume percent. Regarding the corresponding dot-gain range, the dot gain is preferably at least 2.5, which is significant for a glossy recording medium in inkjet printing and beneficial to both image quality and printer productivity. More preferably, the dot gain is at least 3.0, most preferably 3.5 to 15.

Any cross-linking agent may be used in the invention provided it cross-links the polymeric binder discussed above. The cross-linking agent may be a carbodiimide, a polyfunctional aziridine, an aldehyde, an isocyanate, an epoxide, a polyvalent metal cation, a vinyl sulfone, pyridinium, pyridylium dication ether, a methoxyalkyl melamine, a triazine, a dioxane derivative, chrom alum or zirconium sulfate. Preferably, the cross-linking agent is dihydroxydioxane.

To improve colorant fade, UV absorbers, radical quenchers or antioxidants may also be added to the image-receiving layer as is well known in the art. Other additives include pH modifiers, adhesion promoters, rheology modifiers, surfactants, biocides, lubricants, dyes, optical brighteners, matte agents, antistatic agents, etc. In order to obtain adequate coatability, additives known to those familiar with such art such as surfactants, defoamers, alcohol and the like may be used. A common level for coating aids is 0.01 to 0.30 percent active coating aid based on the total solution weight. These coating aids can be nonionic, anionic, cationic or amphoteric. Specific examples are described in MCCUTCHEON's Volume 1: Emulsifiers and Detergents, 1995, North American Edition.

Ink jet inks used to image the recording elements employed in the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

The following examples are provided to illustrate the invention.

EXAMPLES

Example 1

Control Element C-1 (Greater Than 65 Vol. % Particles)

A coating solution for the image-receiving layer was prepared by combining 28.10 g/m$^2$ of fumed alumina particles, Cabosperse PG-033® (Cabot Corp.), 2.9 g/m$^2$ of poly(vinyl alcohol), Gohsenol® GH-23A (Nippon Gohsei Co.), and 1.3 g/m$^2$ of dihydroxydioxane (DHD) cross-linking agent. The weight ratios of these materials are 87%, 9% and 4%, respectively.

The layer was bead-coated at 40° C. on polyethylene-coated paper base, which had been previously subjected to corona discharge treatment. The coating was then dried at 60° C. by forced air in which the thickness of the image-receiving layer was 30 μm.

Element 1 of the Invention

This element was prepared the same as C-1 except that the weight ratios of the materials were 76%, 20% and 4% respectively.

Element 2 of the Invention

This element was prepared the same as the C-1 except that the weight ratios of the materials were 66%, 30% and 4% respectively.

Element 3 of the Invention

This element was prepared the same as the C-1 except that the weight ratios of the materials were 56%, 40% and 4% respectively.

Element 4 of the Invention

This element was prepared the same as the C-1 except that the weight ratios of the materials were 46%, 50% and 4% respectively.

Control Element C-2 (Less Than 20 vol. % Particles)

This element was prepared the same as the C-1 except that the weight ratios of the materials were 36%, 60% and 4% respectively.

Control Element C-3 (Less Than 20 vol. % Particles)

This element was prepared the same as C-1 except that the weight ratios of the materials were 26%, 70% and 4% respectively.

Control Element C-4 (Less Than 20 vol. % Particles)

This element was prepared the same as C-1 except that the weight ratios of the materials were 16%, 80% and 4% respectively.

Control Element C-5 (Less Than 20 vol. % Particles)

This element was prepared the same as C-1 except that the weight ratios of the materials were 6%, 90% and 4% respectively.

Control Element C-6 (Less Than 20 vol. % Particles)

This element was prepared the same as C-1 except that the weight ratios of the materials were 0%, 96% and 4% respectively.

Dot Gain

Test images of cyan drops were printed on the above elements using a typical ink jet print head using the Cyan Ink Composition described below. The drop volume was 16.7 pL corresponding to a drop diameter of 31.7 μm. The resulting dot size was measured relative to the drop diameter and the dot gain or spread factor is reported in Table 1.

Cyan Ink Composition

The cyan ink contained 2% Direct Blue 199 dye, 40% diethylene glycol, 25% diethylene glycol monobutyl ether, and the balance water. The viscosity and surface tension of the ink are 8.4 cP and 33 dyne/cm, respectively.

TABLE 1

| Element | Alumina/PVA/DHD (wt. %) | Volume % of Alumina | Coating Weight (g/m$^2$) | Dot Gain |
|---|---|---|---|---|
| C-1 | 87/9/4 | 66.8 | 32.3 | 2.1 |
| 1 | 76/20/4 | 48.7 | 32.3 | 2.9 |
| 2 | 66/30/4 | 36.8 | 32.3 | 12.6 |
| 3 | 56/40/4 | 27.6 | 32.3 | 14.7 |
| 4 | 46/50/4 | 20.4 | 26.9 | 14.6 |
| C-2 | 36/60/4 | 14.4 | 26.9 | 12.6 |
| C-3 | 26/70/4 | 9.54 | 21.5 | 9.2 |
| C-4 | 16/80/4 | 5.41 | 21.5 | 7.4 |
| C-5 | 6/90/4 | 1.88 | 21.5 | 6.9 |
| C-6 | 0/96/4 | 0.00 | 21.5 | 4.7 |

The above results show that the Elements of the Invention have a substantially greater Dot Gain than the Control Element C-1 which had greater than 65% by volume of particles. While Control Elements C-2, C-3, C-4, C-5 and C-6 had improved Dot Gain as compared to C-1, these elements would not be porous and would have the disadvantages discussed previously. When a high dot gain medium is used for printing, the ink should have a higher concentration of colorant (directly proportional to the dot gain of the medium) in order to achieve the same image density as a nominal dot gain medium.

Example 2

This Example was the same as Example 1 except that the support was transparent poly(ethylene terephthalate), the particles were fumed silica, Cabosperse PG-001® (Cabot Corp.), the coating weight was 32.3 g/m$^2$, the thickness of the image-receiving layer was 30 μm, the drop diameter was 31.3 μm (16.0 pL) and the ink composition was a black ink comprising Reactive Black 31 black dye, glycerol, diethylene glycol, butoxytriglycol and water. The viscosity and surface tension of the ink are 3.0 cP and 38 dyne/cm, respectively. Elements 7 through 13 and Control Element C-7 were prepared using the amounts shown in Table 2 below. The following results were obtained:

TABLE 2

| Element | Silica/PVA/DHD (wt. %) | Volume % of Silica | Dot Gain |
|---|---|---|---|
| 7 | 65/31/4 | 50.3 | 2.3 |
| 8 | 60/36/4 | 45.0 | 2.7 |
| 9 | 55/41/4 | 40.0 | 3.5 |
| 10 | 50/46/4 | 35.3 | 7.6 |
| 11 | 45/51/4 | 30.9 | 7.9 |
| 12 | 40/56/4 | 26.7 | 7.5 |
| 13 | 35/61/4 | 22.7 | 4.3 |
| C-7 | 30/66/4 | 19.0 | 4.2 |

The above results show that the Elements of the invention using silica and a transparent support of the invention have a significant Dot Gain. While C-7 had improved Dot Gain, this element would not be porous and would have the disadvantages discussed previously Although the invention has been described in detail with reference to certain preferred embodiments for the purpose of illustration, it is to be understood that variations and modifications can be made by those skilled in the art without departing from the spirit and scope of the invention

What is claimed is:

1. A method of inkjet printing comprising applying an ink jet ink drop having a viscosity of about 2.5 to about 8.5 cP and a surface tension of about 25 to 45 dyne/cm to the surface of porous ink jet recording medium comprising a support having thereon an image-receiving layer, said image-receiving layer containing:

a) from about 20 to about 50% by volume of or inorganic or organic particles, said inorganic or organic particles having a particle size of from about 0.01 μm to about 0.1 μm;

b) from about 25 to about 70% by volume of a polymeric binder; and c) up to about 10% by volume of a cross-linking agent;

whereby the diameter of said ink jet ink dot is increased relative to that which would have been obtained if said image-receiving layer had greater than about 50% by volume of said inorganic or organic particles, wherein the dot gain is 2.5 to 15.

2. The method claim 1 wherein said organic or inorganic particles comprise alumina, fumed alumina, colloidal alumina, boebmite, clay, calcium carbonate, titanium dioxide, calcined clay, aluminosilicates, silica, colloidal silica, fumed silica, barium sulfate, vinyl chloride/vinyl acetate or urethane.

3. The method of claim 1 wherein said organic or inorganic particles have a particle size of from about 0.03 μm to about 0.07 μm.

4. The method claim 1 wherein said polymeric binder comprises poly(vinyl alcohol), hydroxypropyl cellulose, hydroxypropyl methyl cellulose, gelatin, or a poly(alkylene oxide).

5. The method of claim 1 wherein said polymeric binder is gelatin or poly(vinyl alcohol).

6. The method of claim 1 wherein said cross-linking agent comprises a carbodiimide, a polyfunctional aziridine, an aldehyde, an isocyanate, an epoxide, a polyvalent metal cation, a vinyl sulfone, pyridinium, pyridylium dication ether, a methoxyalkyl melamine, a triazine, a dioxane derivative, chrom alum or zirconium sulfate.

7. The method of claim 1 wherein said cross-linking agent comprises dihydroxydioxane.

8. The method of claim 1 wherein said support is polyethylene-coated paper.

9. The method of claim 1 wherein said ink jet ink drop comprises a dye dispersed in water.

10. A method of inkjet printing comprising an ink jet ink drop having a viscosity of about 2.5 to about 8.5 cP and a surface tension of about 25 to 45 dyne/cm to the surface of porous ink jet recording medium comprising a support having thereon an image-receiving layer, said image-receiving layer containing:

a) from about 20 to about 45% by volume of inorganic or organic particles, said inorganic or organic particles having a particle size of from about 0.01 μm to about 0.1 μm;

b) from about 25 to about 70% by volume of a polymeric binder; and c) up to about 10% by volume of a cross-linking agent;

whereby the diameter of said ink jet ink dot is increased 3.0 relative to that which would have been obtained if said image-receiving layer had greater than about 45% by volume of inorganic or organic particles, wherein the dot gain is 3.0 to 15.

11. The method of claim 10 wherein the image-receiving layer comprises not more than 40% by volume of particles and the dot gain is 3.5 to 15.

* * * * *

UNITED STATES PATENT AND TRADEMARK OFFICE

CERTIFICATE OF CORRECTION

PATENT NO. : 7,232,214 B2
APPLICATION NO. : 10/872711
DATED : June 19, 2007

INVENTOR(S) : Yip et al.

It is certified that error appears in the above-identified patent and that said Letters Patent is hereby corrected as shown below:

Column 7, Claim 1, line 31:
After “surface of” insert -- a --;

Column 7, Claim 1, line 34:
After “by volume of” delete “or”;

Column 8, Claim 2, line 1:
Before “clay, calcium carbonate” delete “boebmite” and insert -- boehmite --; and Column 8, Claim 10, line 29:
before “porous ink jet” insert -- a --.

Signed and Sealed this

Eighteenth Day of September, 2007

JON W. DUDAS
*Director of the United States Patent and Trademark Office*